(12) United States Patent     (10) Patent No.: US 9,633,288 B2
Iwanami     (45) Date of Patent: Apr. 25, 2017

(54) IMAGE FORMING APPARATUS

(71) Applicant: FUJI XEROX CO., LTD., Tokyo (JP)

(72) Inventor: Toru Iwanami, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/796,237

(22) Filed: Jul. 10, 2015

(65) Prior Publication Data

US 2016/0232434 A1    Aug. 11, 2016

(30) Foreign Application Priority Data

Feb. 6, 2015    (JP) ................................. 2015-021839

(51) Int. Cl.
| | |
|---|---|
| *G06F 15/00* | (2006.01) |
| *G06K 15/02* | (2006.01) |
| *B41J 29/393* | (2006.01) |
| *G03G 15/00* | (2006.01) |

(52) U.S. Cl.
CPC .......... *G06K 15/027* (2013.01); *B41J 29/393* (2013.01); *G03G 15/5058* (2013.01); *G03G 15/55* (2013.01); *G03G 2215/00569* (2013.01)

(58) Field of Classification Search
None
See application file for complete search history.

(56) References Cited

U.S. PATENT DOCUMENTS

| | | | | | |
|---|---|---|---|---|---|
| 4,408,232 | A | * | 10/1983 | Itoh ......................... | H04N 1/40 358/445 |
| 2014/0168677 | A1 | * | 6/2014 | Mukaibara ......... | H04N 1/00031 358/1.9 |
| 2014/0320916 | A1 | * | 10/2014 | Kato .................... | H04N 1/6044 358/1.15 |

FOREIGN PATENT DOCUMENTS

JP            4515831 B2     8/2010

* cited by examiner

*Primary Examiner* — Helen Q Zong
(74) *Attorney, Agent, or Firm* — Oliff PLC

(57) ABSTRACT

An image forming apparatus includes a density-measuring unit that has a substantially circular measurement field and that measures a density of a to-be-measured image for density measurement, which is moving in a moving direction, and a density-control unit that controls a density of an image and includes a to-be-measured image forming unit that forms the to-be-measured image having a shape following an outline of a density-measurement area defined by a path of the measurement field during a measurement rather than a substantially rectangular shape extending in the moving direction and including a front end of the to-be-measured image in the moving direction, the shape being within the substantially rectangular shape, a density-measuring section that causes the density-measuring unit to measure a density of the to-be-measured image, and a gradation-correction unit that performs gradation correction on the image by using the density of the to-be-measured image measured by the density-measuring section.

7 Claims, 6 Drawing Sheets

IMAGE FORMING APPARATUS

CROSS-REFERENCE TO RELATED APPLICATIONS

This application is based on and claims priority under 35 USC 119 from Japanese Patent Application No. 2015-021839 filed Feb. 6, 2015.

BACKGROUND

Technical Field

The present invention relates to an image forming apparatus.

SUMMARY

According to an aspect of the invention, there is provided an image forming apparatus including a density-measuring unit that has a substantially circular measurement field and that measures a density of a to-be-measured image for density measurement while the to-be-measured image is moving in a moving direction and a density-control unit that controls a density of an image. The density-control unit includes a to-be-measured image forming unit that forms a to-be-measured image that is the to-be-measured image for density measurement and that has a shape following an outline of a density-measurement area, which is defined by a path of the measurement field of the density-measuring unit while a density measurement is performed, rather than a substantially rectangular shape that extends in the moving direction and includes a front end of the to-be-measured image in the moving direction, the shape following the outline of the density-measurement area being within the substantially rectangular shape, a density-measuring section that causes the density-measuring unit to measure a density of the to-be-measured image formed by the to-be-measured image forming unit, and a gradation-correction unit that performs gradation correction on the image by using a density of the to-be-measured image measured by the density-measuring section.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described below.

Figure 1:
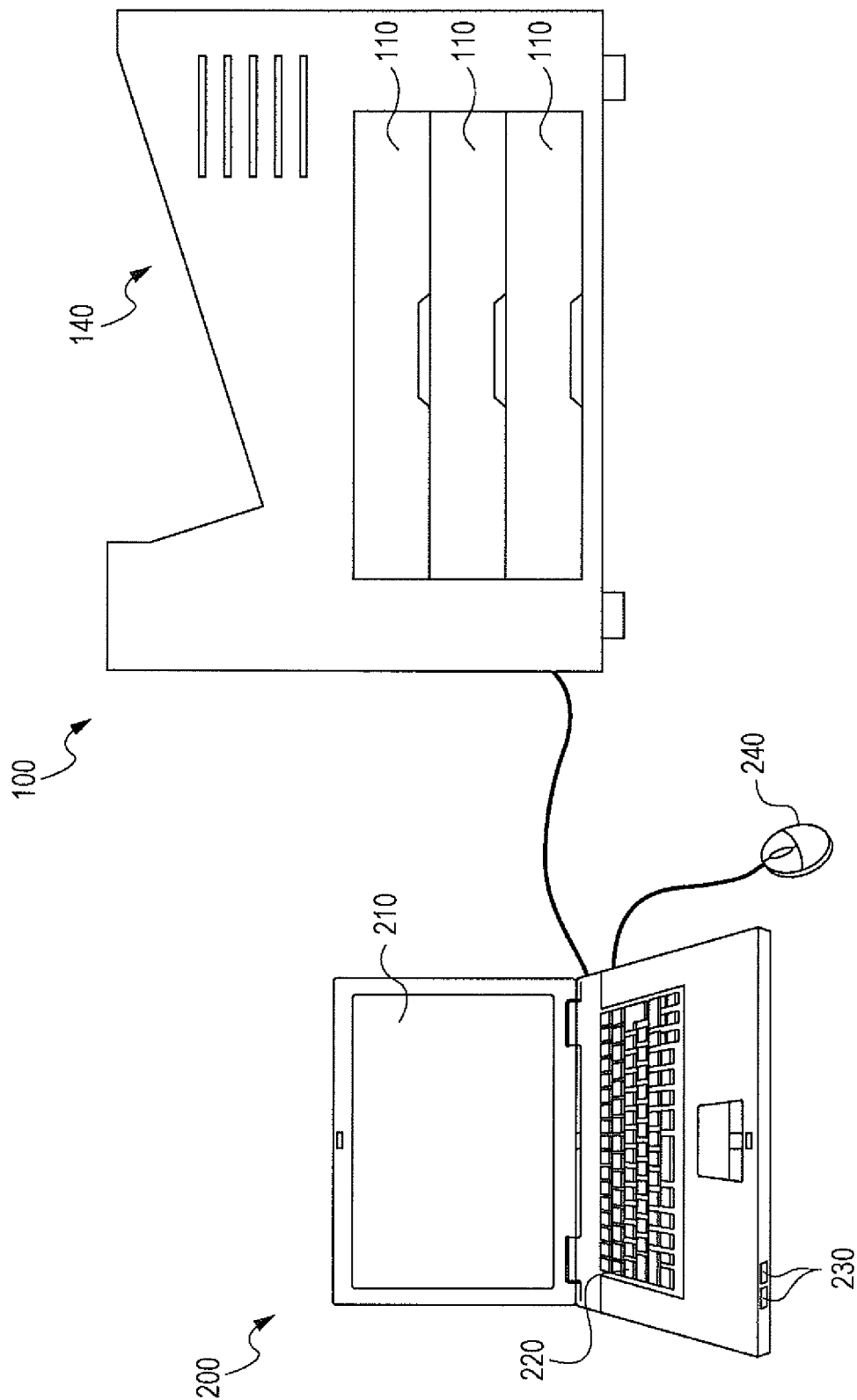
FIG. 1 is a schematic diagram illustrating the appearance of a printer.

FIG. 1 is a schematic diagram illustrating the appearance of a printer 100. The printer 100 is an embodiment of an image forming apparatus. A notebook-sized personal computer (hereinafter referred to as note PC) 200 is connected to the printer 100.

Three drawer-type sheet trays 110 are disposed in a lower portion of the printer 100. Plural sheets P to be used for a print operation are accommodated in the sheet trays 110 in such a manner as to be stacked on top of one another, and the type of the sheets P, such as the dimensions of the sheets P, differs between the sheet trays 110.

A sheet-exit tray 140 to which one of the sheets P, on which an image has been printed, is to be ejected is disposed in an upper portion of the printer 100.

The note PC 200 illustrated in FIG. 1 serves to transmit image data to the printer 100 and serves as a user interface (UI) of the printer 100.

The note PC 200 includes a display screen 210, a keyboard 220, plural memory slots 230, and a mouse 240.

Various information items related to the printer 100 are to be displayed on the display screen 210. The keyboard 220 and the mouse 240 are tools that are to be operated in order to input various instructions for the printer 100. Plural types of external memories, such as a memory card and a universal serial bus (USB) memory, are inserted into the memory slots 230, and an external memory, in which image data for a print operation is stored, is inserted into one of the memory slots 230. The image data stored in the external memory is read by the note PC 200 and transmitted to the printer 100. The printer 100 prints an image based on the transmitted image data on one of the sheets P, which is taken out from one of the sheet trays 110, and ejects the sheet P to the sheet-exit tray 140.

Figure 2:
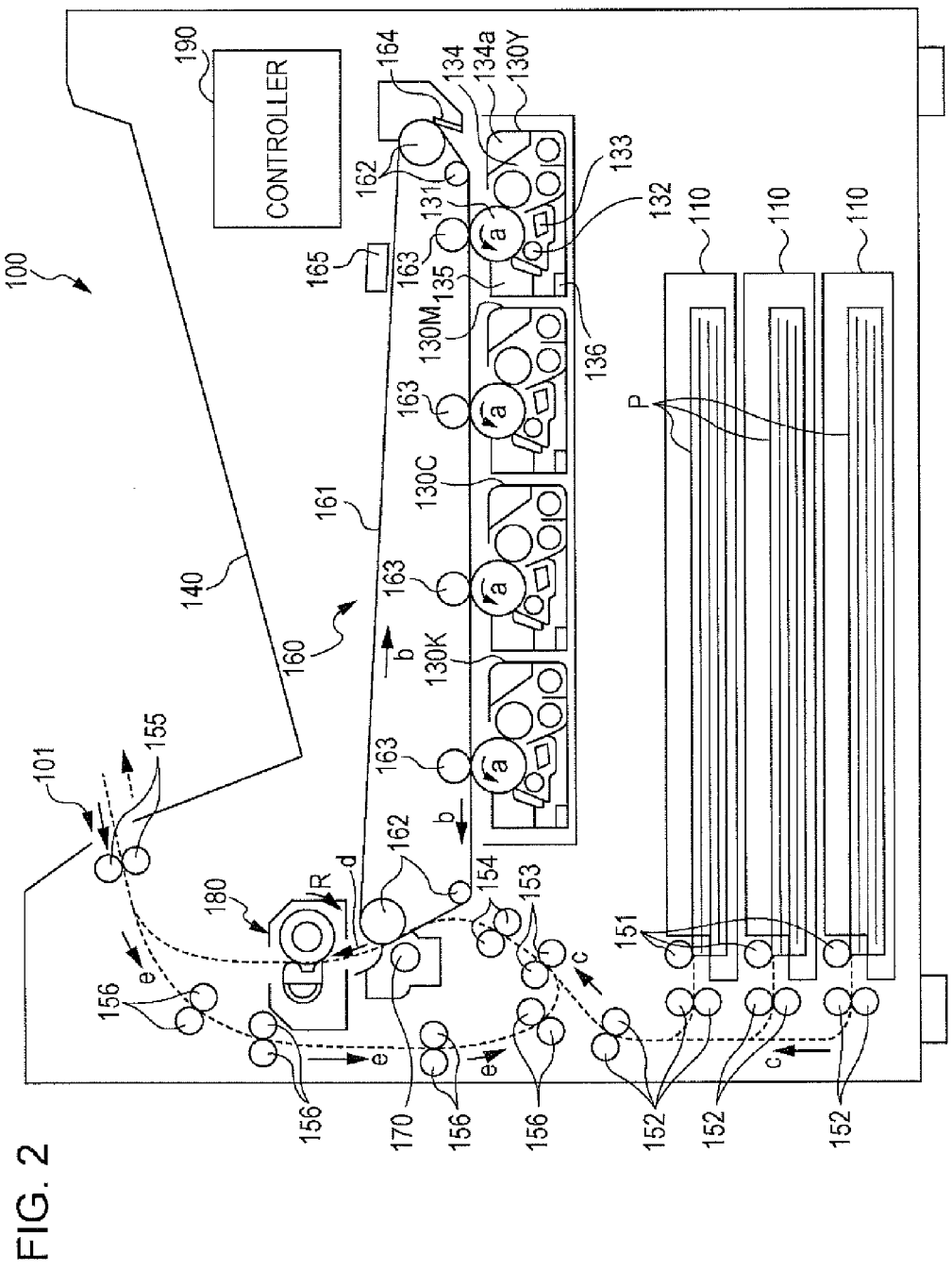
FIG. 2 is a diagram illustrating an internal structure of the printer, whose appearance is illustrated in FIG. 1.

FIG. 2 is a diagram illustrating an internal structure of the printer 100 whose appearance is illustrated in FIG. 1.

The three drawer-type sheet trays 110 are disposed in the lower portion of the printer 100, and the plural sheets P, which are to be used for a print operation and which have not yet been used, are accommodated in the sheet trays 110 in such a manner as to be stacked on top of one another. The type of the sheets P differs between the sheet trays 110. In the case of printing an image, some of the sheets P are taken out one by one from one of the sheet trays 110, which is specified, by a pickup roller 151 and transported by transport rollers 152. Details of transportation of the sheets P will be described later.

Four image forming engines 130 are mounted in the printer 100. The four image forming engines 130 are cartridge-type image forming engines and are individually removable from the printer 100. Each of the image forming engines 130 contains a monochromatic color toner, and the image forming engine 130 forms a monochromatic color toner image by using the monochromatic color toner.

In the following description, when the image forming engines 130 are described in such a manner as to be distinguished in terms of toner color, the letters Y, M, C, and K, which represent the toner colors (yellow, magenta, cyan, and black), will be given to the reference numeral 130, which represents each of the image forming engines.

In the present exemplary embodiment, the image forming engines 130 have the same configuration. Each of the image forming engines 130 includes a photoconductor 131 that rotates in the direction of arrow a, a charger 132, an exposure unit 133, a developing unit 134, and a cleaner 135. The charger 132, the exposure unit 133, the developing unit 134, and the cleaner 135 are disposed around the photoconductor 131.

Each of the chargers 132 uniformly charges a surface of the corresponding photoconductor 131.

Each of the exposure units 133 radiates exposure light, which is modulated on the basis of image data, onto the corresponding photoconductor 131 so as to form an electrostatic latent image on the photoconductor 131. Image data representing a monochromatic color image is input to each of the image forming engines 130, the monochromatic color image being formed of the color toner contained in the corresponding image forming engine 130. Then, each of the exposure units 133 radiates exposure light, which is modulated on the basis of the image data representing the corresponding monochromatic color image, and an electrostatic latent image representing the monochromatic color image is formed on the corresponding photoconductor 131.

Each of the developing units 134 develops an electrostatic latent image on the corresponding photoconductor 131 with the corresponding toner and forms a monochromatic color toner image on the photoconductor 131. Each of the developing units 134 includes a toner cartridge 134a. Each of the toner cartridges 134a contains a monochromatic color toner for the corresponding developing unit 134. The toner in each of the toner cartridges 134a is supplied to the corresponding developing unit 134 and used for formation of a toner image. Each of the toner cartridges 134a may individually be replaced and is replaced with a new toner cartridge 134a when the toner cartridge 134a is empty.

An intermediate transfer unit 160 is disposed above the image forming engines 130. The intermediate transfer unit 160 includes an endless intermediate transfer belt 161, plural support rollers 162 that support the intermediate transfer belt 161, four first transfer rollers 163, a cleaner 164, and a sensor 165.

The intermediate transfer belt 161 is supported by the plural support rollers 162 and moves circularly in the direction of arrow b while passing through a movement path extending along the four image forming engines 130.

The four first transfer rollers 163 are disposed at positions facing the photoconductors 131 of the image forming engines 130 with the intermediate transfer belt 161 interposed between the first transfer rollers 163 and the photoconductors 131, and each of the first transfer rollers 163 serves to transfer a toner image formed on the corresponding photoconductor 131 onto the intermediate transfer belt 161.

Toner images that are formed on the photoconductors 131, which are included in the four image forming engines 130, are sequentially transferred onto the intermediate transfer belt 161, which moves in the direction of arrow b, in such a manner as to be superposed with one another by operation of the first transfer rollers 163.

After the toner images have been transferred, residual toner and the like that remain on the surfaces of the photoconductors 131 are removed by the corresponding cleaners 135. The sensor 165 measures the density of a patch (described later) that has been transferred to the intermediate transfer belt 161. The patch corresponds to an example of a to-be-measured image. The sensor 165 corresponds to an example of a density-measuring unit.

Each of the image forming engines 130 includes a memory 136. In each of the memories 136, various information items related to the corresponding image forming engine 130, such as the color of the toner used in the image forming engine 130 and an accumulated operation time of the image forming engine 130 from the beginning of use are recorded. When the image forming engines 130 are mounted in the printer 100, the contents of the memories 136 are read by the printer 100, and the contents of the memories 136 are rewritten as necessary.

Toner images that have been sequentially transferred to the intermediate transfer belt 161 in such a manner as to be superposed with one another are transferred, by operation of a second transfer roller 170, onto one of the sheets P that is transported to the position of the second transfer roller 170 in accordance with the timing at which the toner images are delivered to the position of the second transfer roller 170. A fixing unit 180 applies heat and pressure to the sheet P on which the toner images have been transferred. As a result, an image that is formed of the toner images, which have been fixed to the sheet P, is printed on the sheet P, and the sheet P is ejected to the sheet-exit tray 140 through a sheet-ejection port 101 by sheet ejection rollers 155.

On the other hand, after the toner images have been transferred, residual toner and the like that remain on a surface of the intermediate transfer belt 161 are removed by the cleaner 164.

A transport path along which the sheets P are to be transported in a print operation will now be described.

When a print operation is performed, one of the sheets P is taken out from one of the three sheet trays 110, which is specified, by the pickup roller 151 and is transported in the direction of arrow c by the transport rollers 152 and transport rollers 153 until a leading end of the sheet P reaches timing-adjustment rollers 154. After that, in accordance with the timing at which toner images, which have been transferred to the intermediate transfer belt 161, are delivered to the position of the second transfer roller 170, the sheet P is sent out by the timing-adjustment rollers 154 so as to be delivered to the position of the second transfer roller 170, and the toner images are transferred onto the sheet P by operation of the second transfer roller 170. The sheet P, to which the toner images have been transferred, is further transported in the direction of arrow d, and the toner images are fixed onto the sheet P by the fixing unit 180. Then, the sheet P is ejected to the sheet-exit tray 140 by the sheet ejection rollers 155.

In the case of performing two-sided printing in which an image is printed on both first and second surfaces of one of the sheets P, a portion of the sheet P having an image only printed on the first surface thereof is ejected to the sheet-exit tray 140 by the sheet ejection rollers 155, and the portion of the sheet P, which has been ejected, is drawn into the printer 100 again as a result of the sheet ejection rollers 155 rotating in a reverse direction.

The sheet P, which has drawn in the printer 100, is transported in the direction of arrow e by transport rollers 156 and further transported by the transport rollers 153, and the leading end of the sheet P reaches the timing-adjustment rollers 154. A process that is to be subsequently performed is similar to that in the case of printing an image on the first surface of the sheet P, and the sheet P having an image printed on the second surface is ejected to the sheet-exit tray 140.

A controller 190 performs overall control of the printer 100. The controller 190 corresponds to an example of a density-control unit.

Figure 3:
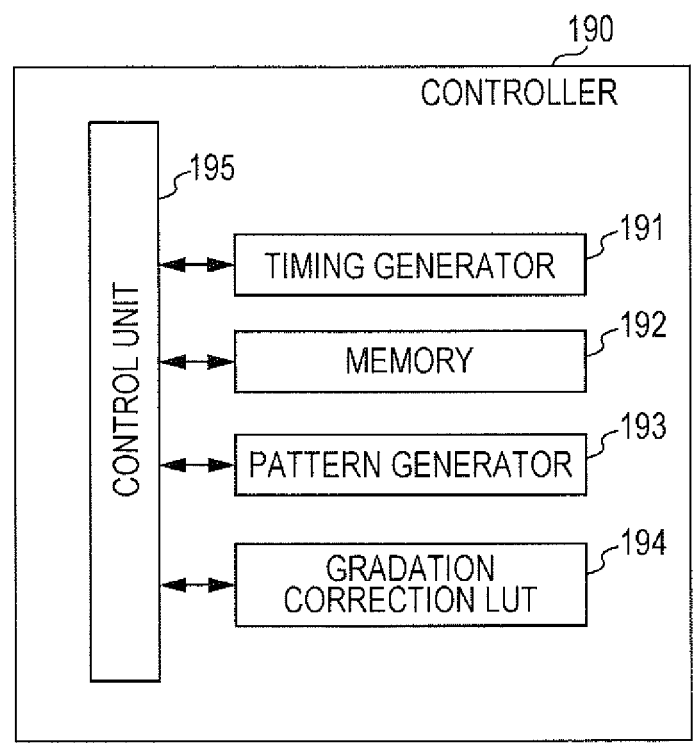
FIG. 3 is a block diagram illustrating an internal structure of a controller.

FIG. 3 is a block diagram illustrating an internal structure of the controller 190.

The controller 190 controls the operation of each unit of the printer 100, which is illustrated in FIG. 1 and FIG. 2, and communication between the printer 100 and the note PC 200. The controller 190 includes a timing generator 191, a memory 192, a pattern generator 193, a gradation correction look up table (LUT) 194, and a control unit 195.

The timing generator 191 generates a timing signal that determines an operation timing of each unit included in the printer 100.

Various programs and data for operating the printer 100 are stored in the memory 192.

The pattern generator 193 forms various patterns, such as a dot pattern used in the case of forming an image and a pattern of a toner patch, which will be described later.

The gradation correction LUT 194 is a memory in which an LUT for gradation correction is to be stored.

The control unit 195 controls the operation and the like of each unit of the printer 100 by communicating with the inside of the controller 190 and the outside.

In the case of adjusting the gradation correction LUT 194, a patch for density measurement (described later) is formed into a shape formed by the pattern generator 193 and measured by the sensor 165, and the gradation correction LUT 194 is adjusted on the basis of the measured value. When an image print operation instructed by a user is performed, gradation correction is performed on image data with reference to the gradation correction LUT 194, and an image formed by using the image data, on which the gradation correction has been performed, is printed out.

Figure 4:
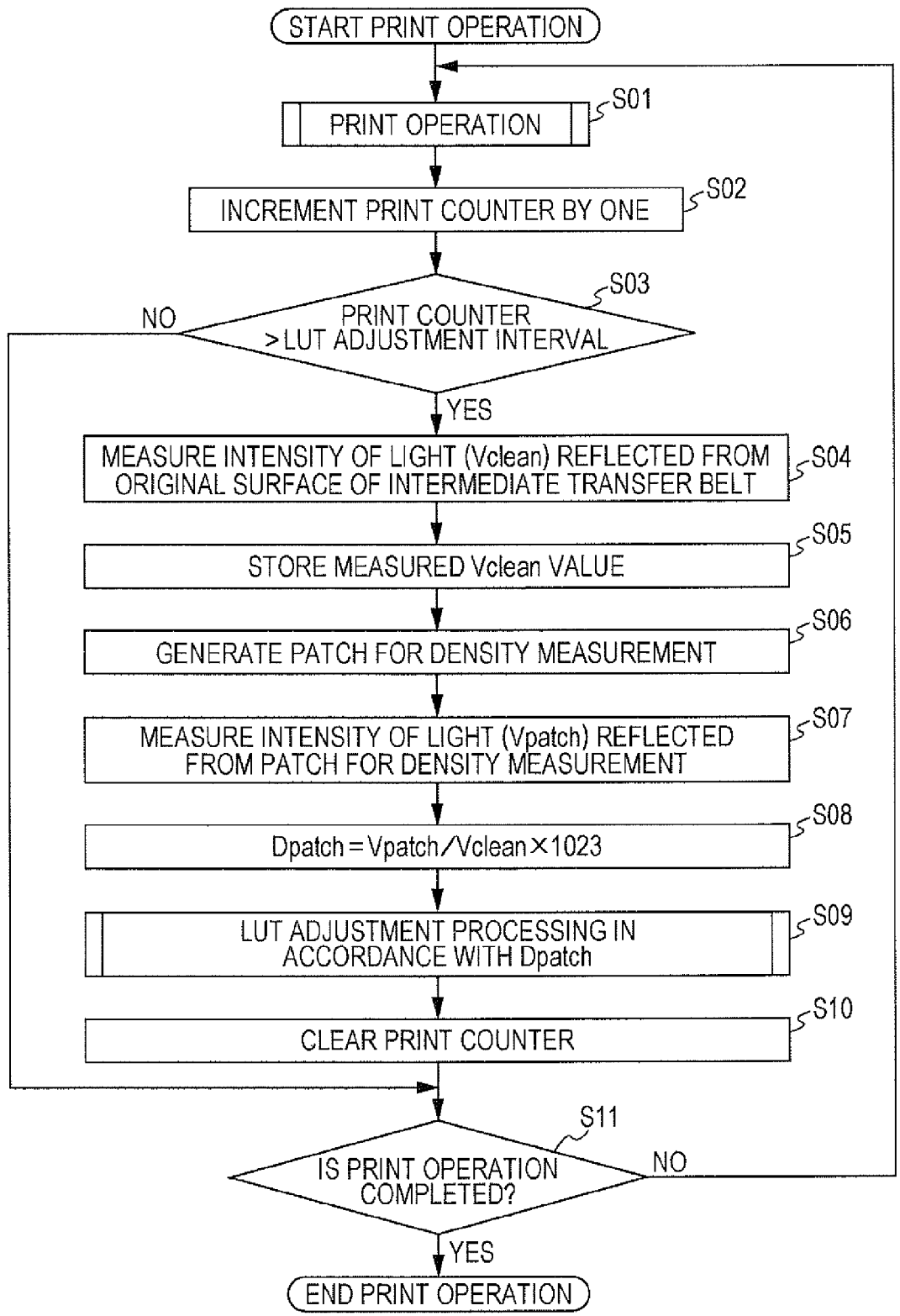
FIG. 4 is a flowchart illustrating processing including LUT adjustment processing in a print operation.

FIG. 4 is a flowchart illustrating processing including LUT adjustment processing in a print operation.

First, in this processing, an image print operation is performed in response to an instruction from a user received from the note PC 200, and an image is printed out on one of the sheets P (step S01). Then, the count value of a print counter is incremented by one.

In the printer 100, the LUT is adjusted at LUT adjustment intervals, that is, for each predetermined number of the sheets P on which an image is to be printed. The print counter is a counter used for recognizing that the timing at which the LUT adjustment processing is to be performed has come.

In step S03, it is determined whether the count value of the print counter exceeds the LUT adjustment intervals. When the count value of the print counter is not greater than the LUT adjustment intervals, the LUT adjustment processing will not be performed, and the processing proceeds to step S11. Then, it is determined whether all the print operations instructed by the user have been completed. In the case where there is still an image to be printed out, the processing returns to step S01, and the next print operation is performed.

In step S03, when it is determined that the count value of the print counter exceeds the LUT adjustment intervals, the following LUT adjustment processing is performed.

First, the intensity of light (Vclean) reflected from the original surface of the intermediate transfer belt 161 (surface of the intermediate transfer belt 161 on which no patch and no image are formed) is measured by the sensor 165 (step S04), and the measured value Vclean is stored (step S05). However, in the case where the measurement is performed at only one point on the surface of the intermediate transfer belt 161, the measured value is likely to be influenced by small scratches and contamination of the intermediate transfer belt 161, and thus, a portion of the intermediate transfer belt 161 having a reasonable length in a moving direction of the intermediate transfer belt 161 (direction of arrow b illustrated in FIG. 1) is measured or the measurement is performed several times so as to calculate an average value. Here, as the sensor 165, a sensor that irradiates the intermediate transfer belt 161 in such a manner as to form a light spot for the measurement and measures the intensity of reflected light is employed.

In the present exemplary embodiment, the sensor 165 has a substantially circular measurement field and, the spot diameter of a light spot formed on the intermediate transfer belt 161 as a result of light radiation is set to be large enough to sufficiently cover the measurement field.

Next, a patch for density measurement is formed and transferred onto the intermediate transfer belt 161 (step S06), and the intensity of light (Vpatch) reflected from the patch for density measurement is measured by the sensor 165 (step S07). The density Dpatch of the patch for density measurement is calculated from the following expression (step S08).

$$Dpatch = Vpatch/Vclean \times 1023$$

The value "1023" is a value for normalizing the value of the density Dpatch within a range of 0 to 1023.

Subsequently, the LUT is adjusted by using the calculated density Dpatch (step S09). Since a gradation correction LUT and a method of adjusting such a gradation correction LUT are well-known technologies, further descriptions thereof are omitted.

After the LUT adjustment processing has been performed, the count value of the print counter is cleared to zero (step S10). In the case where there is still an image to be printed, the processing returns to step S01, and on the other hand, in the case where all the print operations have been completed, the print processing illustrated in FIG. 4 is exited.

Note that, although the LUT for gradation correction has been described as a method of adjusting image density, the density Dpatch, which is calculated in the above-described manner, may be applied to other well-known technologies, such as, for example, an output of a charger, a developing bias voltage, a change in light exposure, and determination of a toner supply amount.

A feature of the present exemplary embodiment is the shape of the patch for density measurement formed in step S06, and the shape of the patch for density measurement will be described below.

Figure 5:
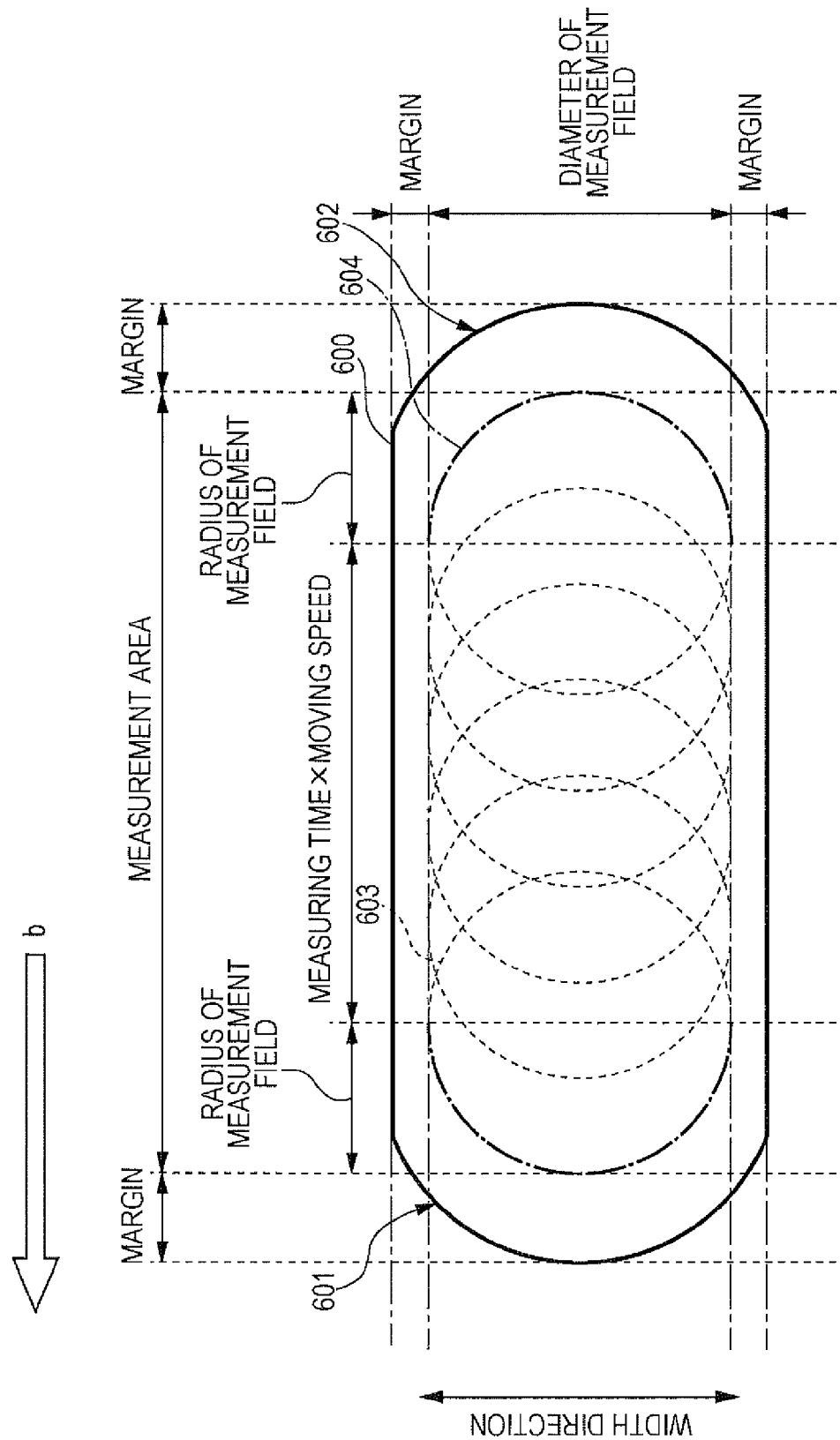
FIG. 5 is a diagram illustrating a first exemplary shape of a patch for density measurement.

FIG. 5 is a diagram illustrating a first exemplary shape of a patch for density measurement.

In the present exemplary embodiment, as a patch 600 for density measurement, a patch that extends in the moving direction of the intermediate transfer belt 161 (direction of arrow b illustrated in FIG. 2) and has a front end edge portion 601 and a rear end edge portion 602 each of which has an arc-shaped or a substantially arc-shaped outline in the moving direction is formed. The sensor 165 momentarily has a substantially circular measurement field 603, which is represented by dashed circles in FIG. 5.

However, since the intermediate transfer belt 161 moves in the direction of arrow b, a portion of the intermediate transfer belt 161 located in an entire measurement area 604, which is defined by the path of the measurement field 603 of the sensor 165 during the period when a density measurement is performed, is to be subjected to the density measurement. The length of the measurement area 604 in the moving direction may be expressed by the following expression.

Length of measurement area 604=measuring time of sensor 165×moving speed of intermediate transfer belt 161+radius of measurement field×2

The length of the patch 600 is a length obtained by adding margins formed in front of and behind the measurement area 604 to the length of the measurement area 604. The margins in the moving direction (direction of arrow b) are areas formed in order to avoid density variations that are likely to occur in end portions of the patch 600 and to accommodate timing variations between the start timing of the patch 600 and the start timing of measurement by the sensor 165.

The timing variations are generated due to errors in the mounting position of the sensor 165 in the direction of arrow b, variations in the moving speed of the intermediate transfer belt 161, control delay time, and the like.

The width of the measurement area 604 in a direction that crosses at right angles to the moving direction (direction of arrow b) is equal to the diameter of the measurement field 603 of the sensor 165. Margins are formed at both sides of the measurement field 603 in a width direction of the measurement area 604. The margins in the width direction are formed in order to accommodate variations in relative positions of the sensor 165 and the patch 600. The variations in the relative positions in the width direction are generated due to errors in the mounting position of the sensor 165 with respect to a light exposure position of one of the exposure units 133 (see FIG. 2) that forms the patch 600, a serpentine movement of the intermediate transfer belt 161 in the width direction, and the like.

In the first exemplary shape illustrated in FIG. 5, since the front end edge portion 601 and the rear end edge portion 602 are each formed in an arc shape or a substantially arc shape, sufficient margins are left around the measurement area 604, and the amount of toner used to form the patch 600 is reduced compared with a patch formed in a rectangular shape or a substantially rectangular shape.

Figure 6:
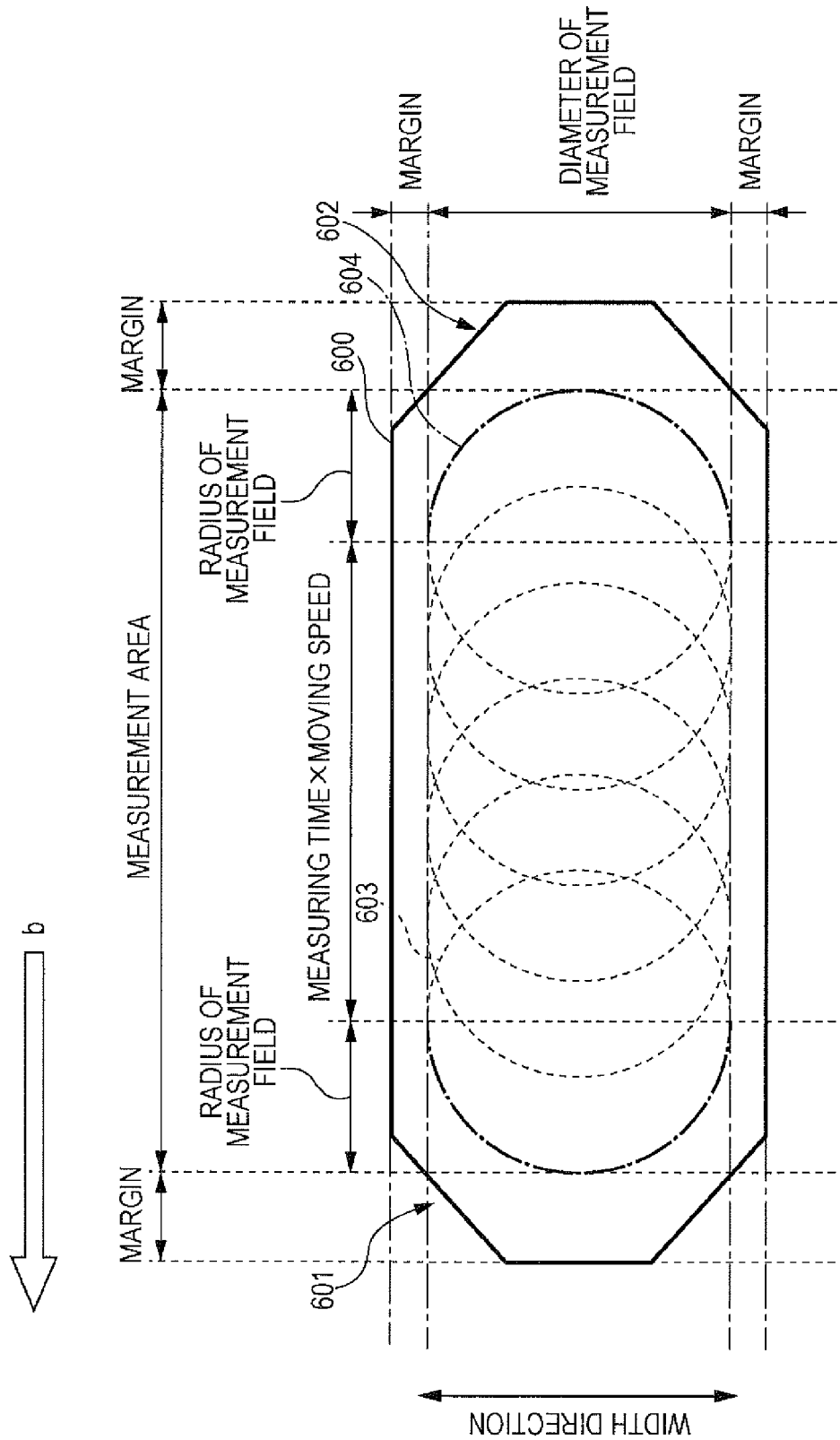
FIG. 6 is a diagram illustrating a second exemplary shape of the patch for density measurement.

FIG. 6 is a diagram illustrating a second exemplary shape of the patch for density measurement. The difference between the second exemplary shape and the first exemplary shape, which is illustrated in FIG. 5, will now be described.

The front end edge portion 601 and the rear end edge portion 602 of the patch 600 illustrated in FIG. 5 are each formed in an arc shape or a substantially arc shape. In contrast, the front end edge portion 601 and the rear end edge portion 602 of the patch 600 illustrated in FIG. 6 are each formed in a polygonal shape or a substantially polygonal shape obtained by trimming a rectangular or substantially rectangular corner. Also in the second exemplary shape illustrated in FIG. 6, sufficient margins are left around the measurement area 604, and the amount of toner used to form the patch 600 is reduced compared with a patch formed in a rectangular shape or a substantially rectangular shape.

Note that, although the case where both the front end edge portion 601 and the rear end edge portion 602 of the patch 600 are formed in an arc shape or a substantially arc shape and the case where both the front end edge portion 601 and the rear end edge portion 602 of the patch 600 are formed in a polygonal shape or a substantially polygonal shape have been described above, a reduction in the amount of toner used to form the patch 600 is also achieved in the case where only one of the front end edge portion 601 and the rear end edge portion 602 is formed in an arc shape or a substantially arc shape or is formed in a polygonal shape or a substantially polygonal shape compared with a patch formed in a rectangular shape or a substantially rectangular shape.

In addition, although the case where the front end edge portion 601 and the rear end edge portion 602 of the patch 600 are formed in an arc shape or a substantially arc shape and the case where the front end edge portion 601 and the rear end edge portion 602 of the patch 600 are formed in a polygonal shape or a substantially polygonal shape have been described above, the shapes of the front end edge portion 601 and the rear end edge portion 602 are not limited to these shapes as long as the patch 600 has a shape following an outline of the measurement area 604, which is defined by the path of the measurement field 603 of the sensor 165 during the period when a measurement is performed, rather than a simple rectangular shape or a simple substantially rectangular shape.

Furthermore, the case where the measurement field 603 of the sensor 165 has a substantially circular shape, and the spot diameter of light, which is radiated for the measurement, is set to be large enough to sufficiently cover the measurement field 603 has been described above, this relationship may be reversed.

In other words, although the measurement field 603 of the sensor 165 would have been larger, the present invention may be designed in such a manner that the light, which is radiated for the measurement, has a substantially circular light spot, and the spot diameter of the light spot is large enough just to irradiate substantially circular areas, each of which is illustrated as the measurement field 603 in FIG. 5 and FIG. 6, so that the measurement field 603 of the sensor 165 is substantially limited by the spot diameter. In this case, each of the substantially circular areas illustrated as the measurement field 603 in FIG. 5 and FIG. 6 is a light spot. In other words, in this case, as the patch 600, a patch that has a shape following an outline of a light-radiation area that is defined by the path of the light spot of the light, which is radiated from the sensor 165, during the period when a measurement is performed rather than the above-mentioned rectangular shape or the above-mentioned substantially rectangular shape is formed.

Note that, although the case where the present invention is applied to the printer 100 illustrated in FIG. 1 and FIG. 2 has been described above, the present invention may be applied to various image forming apparatuses, such as a printer that prints out only a monochrome image.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a density-measuring unit that has a substantially circular measurement field and that measures a density of a to-be-measured image for density measurement while the to-be-measured image is moving in a moving direction; and
   a density-control unit that controls a density of an image based on gradation correction information,
   wherein the density-control unit includes
      an image forming unit that forms the to-be-measured image that has a shape following an outline of a density-measurement area, which is defined by a path of the measurement field of the density-measuring unit while the to-be-measured image is moving in the moving direction and a density measurement is performed,
      a density-measuring section that causes the density-measuring unit to measure a density of the to-be-measured image formed by the to-be-measured image forming unit, and a gradation-correction controller that performs gradation correction on the image by using a density of the to-be-measured image measured by the density-measuring section to adjust the gradation correction information, and wherein a width of the to-be-measured image in a direction perpendicular to the moving direction is larger than a width of the density-measurement area, and the density measurement area is positioned within the to-be-measured image which has the shape following the outline of the density measurement area.

2. The image forming apparatus according to claim 1, wherein the to-be-measured image forming unit forms a to-be-measured image that has a front end edge portion and a rear end edge portion in the moving direction, at least one of the front end edge portion and the rear end edge portion having a substantially arc-shaped outline.

3. The image forming apparatus according to claim 1, wherein the to-be-measured image forming unit forms a to-be-measured image that has a front end edge portion and a rear end edge portion in the moving direction, at least one of the front end edge portion and the rear end edge portion having a substantially polygonal-shaped outline obtained by trimming a substantially rectangular corner.

4. An image forming apparatus comprising:
a density-measuring unit that has a substantially circular measurement field and that measures a density of a to-be-measured image for density measurement while the to-be-measured image is moving in a moving direction; and
a density-control unit that controls a density of an image based on gradation correction information,
wherein the density-control unit includes
a to-be-measured image forming unit that forms a to-be-measured image that is the to-be-measured image for density measurement and that has a shape following an outline of a density-measurement area, which is defined by a path of the measurement field of the density-measuring unit while a density measurement is performed, rather than a substantially rectangular shape that extends in the moving direction and includes a front end of the to-be-measured image in the moving direction, the shape following the outline of the density-measurement area being within the substantially rectangular shape,
a density-measuring section that causes the density-measuring unit to measure a density of the to-be-measured image formed by the to-be-measured image forming unit, and a gradation-correction controller that performs gradation correction on the image by using a density of the to-be-measured image measured by the density-measuring section to adjust the gradation correction information, wherein, the density-measuring unit radiates light for density measurement that has a substantially circular light spot onto the to-be-measured image, whose density is to be measured, and wherein, the to-be-measured image forming unit forms a to-be-measured image that has a shape following an outline of a light-radiation area, which is defined by a path of the light spot of the light emitted from the density-measuring unit while the density measurement is performed, rather than the substantially rectangular shape.

5. The image forming apparatus according to claim 4, wherein the to-be-measured image forming unit forms a to-be-measured image that has a front end edge portion and a rear end edge portion in the moving direction, at least one of the front end edge portion and the rear end edge portion having a substantially arc-shaped outline.

6. The image forming apparatus according to claim 4, wherein the to-be-measured image forming unit forms a to-be-measured image that has a front end edge portion and a rear end edge portion in the moving direction, at least one of the front end edge portion and the rear end edge portion having a substantially polygonal-shaped outline obtained by trimming a substantially rectangular corner.

7. An image forming apparatus comprising:
a density-measuring section that measures a density of a to-be-measured image for density measurement;
a density controller that controls a density of an image based on gradation correction information;
an image forming unit that forms the to-be-measured image whose end portion in a moving direction, which is a center portion in a width direction, has a substantially convex shape; and
a gradation-correction controller that performs gradation correction on the image by using a density of the to-be-measured image measured by the density-measuring section to adjust the gradation correction information, and
wherein a width of the to-be-measured image in a direction perpendicular to the moving direction is larger than a width of the density-measurement area, and the density measurement area is positioned within the to-be-measured image which has the substantially convex shape.

* * * * *